United States Patent [19]
Akamatsu

[11] Patent Number: 5,731,766
[45] Date of Patent: Mar. 24, 1998

[54] ROUTE GUIDE SYSTEM AND METHOD

[75] Inventor: Motoyuki Akamatsu, Tsukuba, Japan

[73] Assignee: Agency of Industrial Science and Technology, Tokyo, Japan

[21] Appl. No.: 698,988

[22] Filed: Aug. 16, 1996

[30] Foreign Application Priority Data

Aug. 18, 1995 [JP] Japan .................. 7-209828

[51] Int. Cl.⁶ .................................. G08G 1/123
[52] U.S. Cl. ................. 340/988; 340/905; 349/11; 349/13; 359/547; 359/552; 359/436
[58] Field of Search ................. 340/488, 990, 340/995, 905, 980, 461; 345/7, 9; 359/530, 531, 532, 537, 547, 552, 568, 436; 349/1, 11, 13, 15

[56] References Cited

U.S. PATENT DOCUMENTS

| | | | |
|---|---|---|---|
| 4,877,307 | 10/1989 | Kalmanash | 359/465 |
| 5,115,398 | 5/1992 | De Jong | 364/443 |
| 5,323,321 | 6/1994 | Smith, Jr. | 364/449.5 |
| 5,402,120 | 3/1995 | Fujii et al. | 340/988 |
| 5,412,492 | 5/1995 | Zammit et al. | 349/1 |
| 5,422,812 | 6/1995 | Knoll et al. | 364/449.3 |
| 5,619,194 | 4/1997 | Belfer | 340/907 |

FOREIGN PATENT DOCUMENTS

| | | |
|---|---|---|
| 0 454 443 A2 | 10/1991 | European Pat. Off. . |
| 0 615 022 A3 | 9/1994 | European Pat. Off. . |
| 0 202 067 | 11/1986 | France . |
| 3822222 A1 | 1/1990 | Germany . |
| 3905493 A1 | 8/1990 | Germany . |
| 183719 | 11/1986 | Japan . |
| 80700 | 5/1988 | Japan . |
| 42696 | 2/1991 | Japan . |
| 42697 | 2/1991 | Japan . |
| 42698 | 2/1991 | Japan . |
| 4-7698 | 1/1992 | Japan . |
| 4-7699 | 1/1992 | Japan . |
| 4-7700 | 1/1992 | Japan . |
| 23319 | 4/1992 | Japan . |
| 325094 | 12/1993 | Japan . |
| 325095 | 12/1993 | Japan . |
| 325096 | 12/1993 | Japan . |
| 294842 | 11/1995 | Japan . |
| WO 93/09524 | 5/1993 | WIPO . |

*Primary Examiner*—Jeffery Hofsass
*Assistant Examiner*—Benjamin C. Lee
*Attorney, Agent, or Firm*—Spencer & Frank

[57] ABSTRACT

A route guide system for making guidance of the traveling direction in the sight field of the driver during traveling. The road guide plate is provided in front of a turning point. This road guide plate emits light differing in flash timing according to the branching direction. The liquid crystal shutter is provided on the front glass of the vehicle equipped with the navigation system. When making road guidance, ON/OFF operation of the liquid crystal shutter is controlled by an MPU so that only the light of the light-emitting pattern corresponding to the traveling direction according to the traveling direction information of the turning point obtained from route searching toward the targeted location.

10 Claims, 4 Drawing Sheets

ROUTE GUIDE SYSTEM AND METHOD

BACKGROUND OF THE INVENTION

1. Field of the Invention

This invention relates to a route guide system and method using an on-board type route guide apparatus and a road guide plate.

2. Description of the Related Art

While reaching an unknown targeted location or destination by an automobile, a route guide apparatus is proposed which makes a guidance to the targeted location in order to secure reaching to the objective destination. This apparatus is equipped on board of a vehicle, and has therein a map information. Further, when the apparatus is instructed with a destination in advance, the apparatus calculates a shortest route to the destination according to the above map information. When the vehicle starts traveling or running toward the destination, a map in the vicinity of the present position is displayed on a display screen of the apparatus and, when the vehicle comes up to a crossroads or a turning point, a route is displayed by an arrow or the like in the map on the display screen. With such a route guide apparatus, the driver becomes released from a burden of stopping the vehicle to see a map.

However, when the vehicle approaches the crossroads or the turning point, the driver must turn his eyes from the traveling direction to the guide screen of the route guide apparatus. This causes a dangerous state for the driver. For example, at this moment, if a pedestrian runs out to the road, a hazardous thing falls out from another vehicle, or a preceding vehicle suddenly brakes, there may be a danger of leading to an accident.

SUMMARY OF THE INVENTION

In view of the above problems, an object of the present invention is to provide a route guide system and method which can make road guidance without turning the driver's eyes from the running direction.

According to an invention, there is provided a route guide system in which a route guide apparatus is set on a vehicle, and when the vehicle reaches around a turning point during traveling, the route guide apparatus displays the traveling direction of the vehicle to make guidance to the targeted destination, wherein a road guide plate indicating branching directions of a road and emitting light of types differing in light-emitting pattern according to the branching directions is provided in the vicinity of the turning point so that it is visible by a driver of the running vehicle, the route guide apparatus comprising optical means which selectively passes through light of one of the different light-emitting patterns so that it is visible by the driver of the vehicle traveling in the traveling direction of the vehicle, and instruction means for instructing a type of light-emitting pattern to be selectively passed through to the optical means.

Here, optical means may be a liquid crystal shutter, the light-emitting pattern is light-emitting timing, and the liquid crystal shutter passes through a specific light according to the light emitting timing instructed by the instruction means.

The liquid crystal shutter can be disposed on a front glass of the vehicle.

The liquid crystal shutter can be formed in the form of sunglasses wearable by the driver of the vehicle.

The optical means can be a polarizing filter capable of varying the polarization direction, the route guide plate emits light of different polarization direction as light of different light emitting pattern, and the polarizing filter passes through a specific light having a polarization direction instructed by the instruction means.

The polarizing filter can be disposed on a front glass of the vehicle.

The polarizing filter can be formed in the form of sunglasses wearable by the driver of the vehicle.

A synchronizing signal can be transmitted from a ground station for controlling the road guide plate to the route guide apparatus, whereby a light pass timing of the optical means is controlled by the synchronizing signal.

With respect to the light pass timing of the optical means, a ground station for controlling the road guide plate and the route guide apparatus individually may have clocks for achieving synchronism.

According to another aspect of the invention, there is provided a route guide method comprising the steps of: providing a route guide apparatus is set on a vehicle, and when the vehicle reaches nearby a turning point during traveling, the route guide apparatus displays the traveling direction of the vehicle to make guidance to the targeted destination, wherein a road guide plate indicating branching directions of the road and emitting light of different types of light-emitting pattern according to the branching directions is provided in the vicinity of the turning point so that it is visible by a driver of the traveling vehicle, optical means is provided on the vehicle which selectively passes through light of one of the different light-emitting patterns so that it is visible by the driver of the vehicle traveling in the traveling direction of the vehicle, whereby the route guide apparatus instructs the optical means of a type of light-emitting pattern to be selectively passed through.

According to the present invention, the driver feels as if the road guide plate indicates the running direction. Therefore, it is not required for the driver to see the display screen of the route guide apparatus unit as required in the prior art, thereby preventing disturbance to the driving manipulation of the driver.

DETAILED DESCRIPTION OF THE PREFERRED EMBODIMENTS

Preferred embodiments of the present invention will be described in detail with reference to the drawings.

First Embodiment

Figure 1:
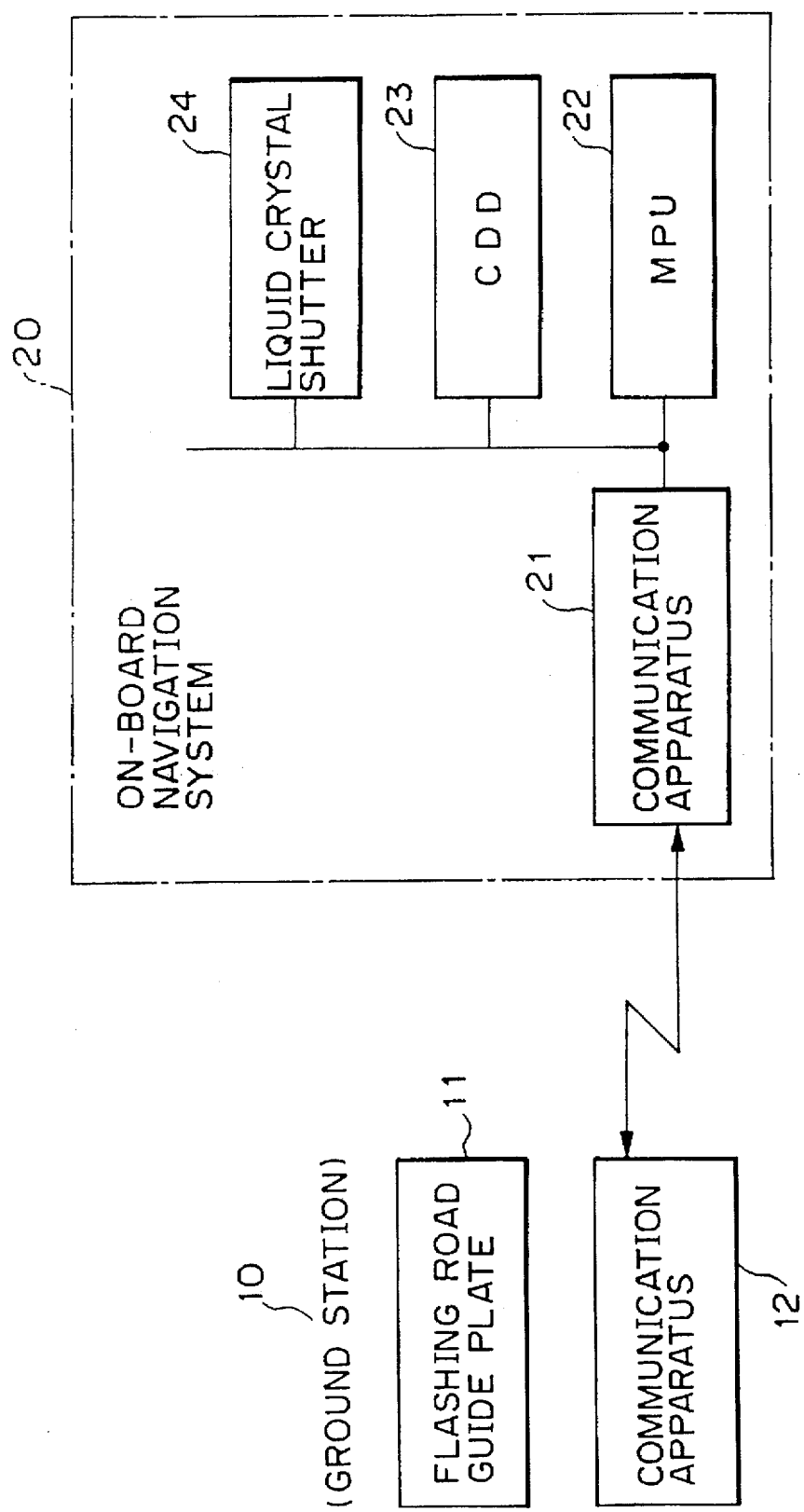
FIG. 1 is a block diagram showing the system arrangement of a first embodiment according to the present invention.
Figure 2:
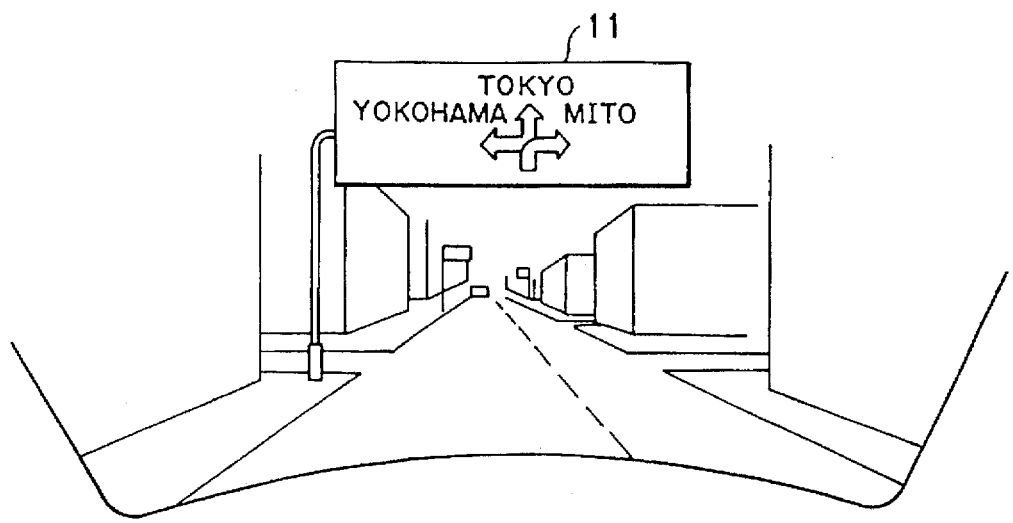
FIG. 2 is a schematic view showing correspondence between the running direction information and the light-emitting pattern in the first embodiment of the present invention.
Figure 2:
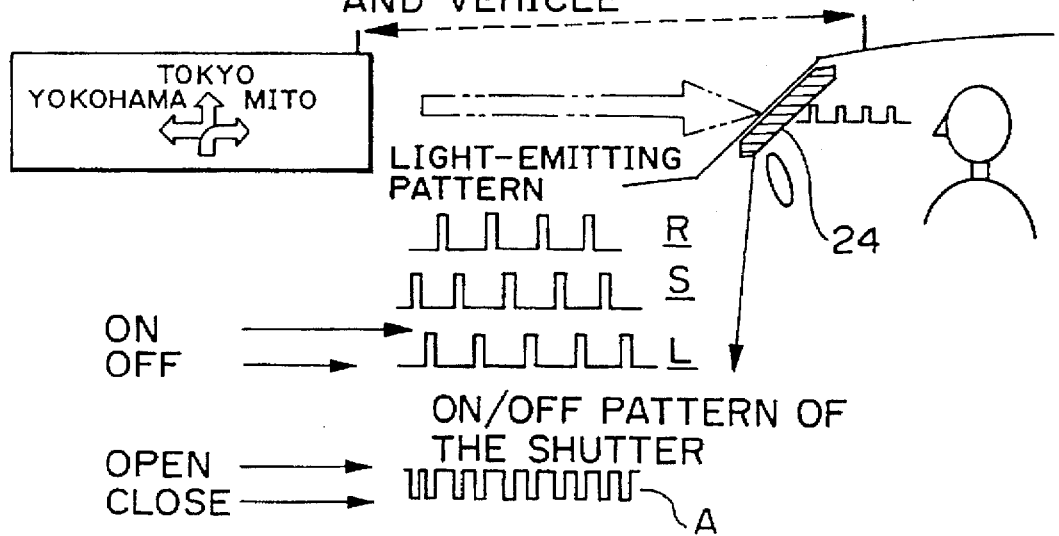

FIG. 1 shows the system arrangement of a first embodiment of the present invention. In FIG. 1, reference numeral 10 indicates a ground station set up on the ground, which comprises a communication apparatus 12 for making communication between a flashing type road guide plate 11 and an on-board type road guide apparatus (hereinafter referred to as navigation system) 20. The flashing road guide plate 11 emits light in a predetermined light-emitting pattern. That is, there are various light-emitting patterns which are different in flash timing, according to the running direction, as shown in FIGS. 2A and 2B. The road guide plate 11 is set up in the vicinity of a crossroads so that it is visible by the driver of the running vehicle. The communication apparatus 12 transmits a synchronizing signal showing its location information and the timing of the above light-emitting pattern in compliance with the request from the navigation system 20.

Figure 3:
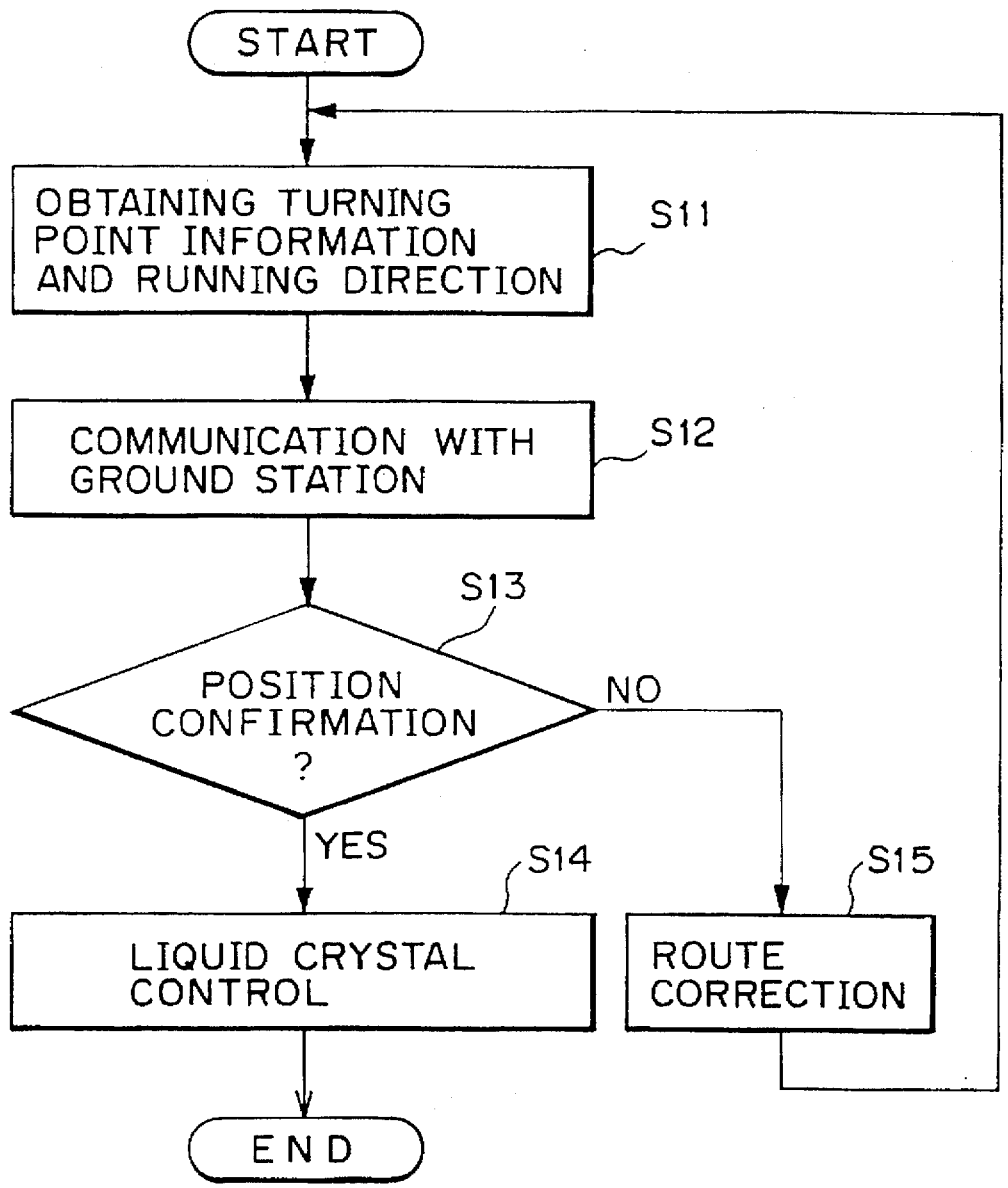
FIG. 3 is a flowchart showing processing in the first embodiment of the present invention.
Figure 4:
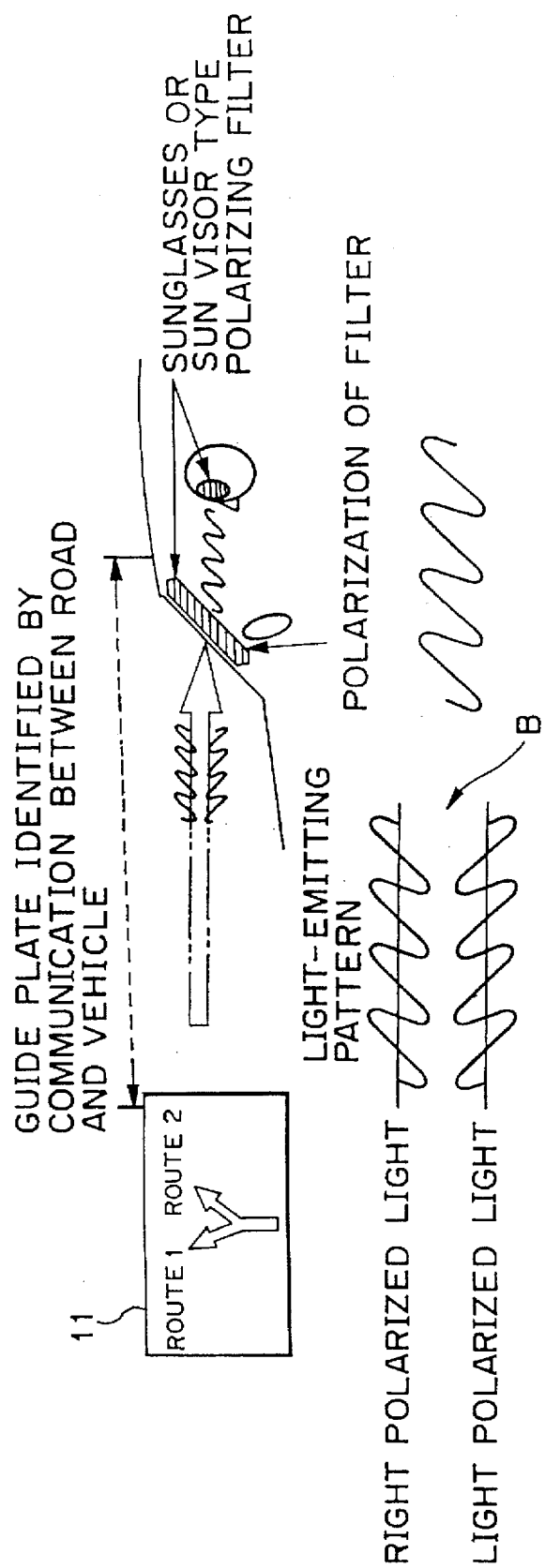
FIG. 4 is a schematic view showing a light-emitting pattern in a third embodiment of the present invention.

The navigation system 20 comprises a communication apparatus 21, a microprocessor (MPU) 22, a CD (compact disk) drive (CDD) 23, and a liquid crystal shutter 24. The communication apparatus 21 performs communication with the communication apparatus 12 of the ground station 10. Content of communication between the communication apparatuses 12 and 21 is positional information of the ground station. The MPU 22 controls the entire system and also calculates running direction information to make route guide. Since the calculation can be performed by various methods well known in the prior art, detailed description thereof is omitted. The MPU further executes the control procedure as shown in FIG. 3 to control the liquid crystal shutter 24, and the road guide plate 11 is seen by the driver as if it indicates the running direction as shown in FIGS. 2A and 2B. The CD in which the map information is stored is set to the CDD 23.

The liquid crystal shutter, as shown in FIG. 2B, is disposed on the front glass of the vehicle to make shutter operation so that flashing light in the direction instructed by the MPU 22, that is, flashing light from the road guide plate 11 is passed through, and flashing light in uninstructed direction is not allowed to pass through. More specifically, when the route guide information indicates the right direction, for example, the liquid crystal shutter 24 is ON/OFF operated at the timing A in FIG. 2B. When the liquid crystal shutter 24 is ON, flashing light indicating the right direction of the road guide plate 11 passes through the liquid crystal shutter 24. Further, background light other than the road guide plate 11 is also passed through, the background and the flashing light indicating the right direction from the road guide plate 11 are visible to the driver. Therefore, the driver feels as if the road guide plate 11 makes road guidance.

A control procedure of the MPU 22 for making such road guidance is shown in FIG. 3. This control procedure is stored in the form of an executable program in the MPU 22. When the MPU 22, by comparing the present location obtained by present location detection processing with turning point information obtained from the map information, knows that the vehicle reaches a point to make guidance of running direction, it executes the processing of FIG. 3. The MPU 22 receives the positional information from the ground station 10 through the communication 21 (step S11→S12). Then, the present location obtained by a route guide processing using a conventional method known in the prior art is compared with the position obtained from the ground station to confirm that the vehicle is running in the vicinity of the turning point (step S13). When it is confirmed that the vehicle is running in the vicinity of the turning point, the MPU 22 controls the liquid crystal shutter by the above method according to the running direction at the turning point obtained by a method similar to the prior art.

On the other hand, when the positional information from the ground station 10 does not coincide with the positional information obtained from the guidance processing, the present positional information used in the guidance processing is corrected to the exact positional information obtained from the ground station 10, and guidance processing is carried out again. After this correction, when it is confirmed that the vehicle is near the turning point, the above processing is carried out again (step S15→S11).

When the vehicle is not around the turning point, the liquid crystal shutter may be controlled to be normally ON (normally passing light).

Second Embodiment

While the liquid crystal shutter 24 is disposed on the front glass of the vehicle in the first embodiment, a sunglass type liquid crystal shutter may alternatively be used.

Third Embodiment

Although the first and second embodiments use a liquid crystal shutter as a means for passing through light from the road guide plate, alternatively, a polarizing filter capable of changing the polarization direction can be disposed on the front glass of the vehicle or used in the form of the sunglasses in place of the liquid crystal shutter. In this case, on the side of the road guide plate 11, for example, right polarized light indicates running in the right direction, and left polarized light indicates traveling in the left direction. It is needless to say that the MPU 22 controls the polarization direction of the filter so that it passes light indicating the traveling direction according to the traveling information of the vehicle.

In addition to the above described embodiments, the following embodiment can be used.

1) In the above embodiments, a synchronizing signal is transmitted from the ground station 10 so that the liquid crystal shutter 24 passes through flashing light of the desired traveling direction. However, when both the ground station 10 and the navigation system 20 have clocks that can measure absolute time, the operation timing of the liquid crystal shutter 26 may be determined by this clock.

2) In order for the navigation system 20 itself to grasp the position of the vehicle during running, a GPS (global positioning system) using a communication satellite and a method in which the running distance is integrated and compared with a map are known, and either method can be used. Further, it is advantageous to describe the positions of the road guide plates described in the above embodiments in the map information. This enhances the detection accuracy of running position by comparing with the positional information from the ground station when detecting the present position of the vehicle at the navigation system 20 side, or can determine necessity of displaying the traveling direction by the liquid crystal shutter 24.

3) Since the road guide plate used on a freeway or the like often is bifurcated, the third embodiment is preferable which uses the polarizing filter. For general roads, the first embodiment is preferable which uses the liquid crystal shutter.

4) While embodiments have been shown which dispose a liquid crystal shutter and/or a polarizing filter on the front glass of the vehicle to notify the running direction to the driver, or use them in the form of the sunglasses. The optical means may be provided on the front face of the helmet. In either case, a tool may be used which makes the road guide plate 11 visible to the driver, and the present invention is not limited to the above embodiments.

5) Normally, the traveling direction is indicated by the liquid crystal shutter 24 in the direction instructed from the navigation system 20, but when an unusual situation occurs, for example, the road of the running direction is closed due to a traffic accident or the like, the instruction from the ground station 10 can be used in preference to indicate the running direction. In this case, information showing the priority of the instruction from the ground station 10 is transmitted from the ground station 10 to the navigation system 20. The navigation system invalidates its own traveling direction information, and controls the liquid crystal shutter 24 using the running direction information instructed from the ground station 10.

What is claimed is:

1. A route guide system in which a route guide apparatus is set on a vehicle, and when said vehicle reaches around a turning point during traveling, said route guide apparatus displays the traveling direction of said vehicle to make guidance to the targeted destination, wherein a road guide plate indicating branching directions of a road and emitting light of types differing in light-emitting pattern according to the branching directions is provided in the vicinity of the turning point so that it is visible by a driver of the running vehicle;

the route guide apparatus comprising optical means which selectively passes through light of one of the different light-emitting patterns so that it is visible by the driver of said vehicle traveling in the traveling direction of said vehicle; and instruction means for instructing a type of light-emitting pattern to be selectively passed through said optical means.

2. A route guide system as claimed in claim 1, wherein a synchronizing signal is transmitted from a ground station for controlling said road guide plate to said route guide apparatus, whereby a light pass timing of said optical means is controlled by said synchronizing signal.

3. A route guide system as claimed in claim 1, wherein, with respect to the light pass timing of said optical means, a ground station for controlling said road guide plate and said route guide apparatus individually have clocks for achieving synchronism.

4. A route guide system as claimed in claim 1, wherein said optical means is a liquid crystal shutter, the light-emitting pattern is light-emitting timing, and said liquid crystal shutter passes through a specific light according to the light emitting timing instructed by said instruction means.

5. A route guide system as claimed in claim 4, wherein said liquid crystal shutter is disposed on a front glass of said vehicle.

6. A route guide system as claimed in claim 4, wherein said liquid crystal shutter is formed in the form of sunglasses wearable by said driver of said vehicle.

7. A route guide system as claimed in claim 1, wherein said optical means is a polarizing filter capable of varying the polarization direction, said route guide plate emits light of different polarization direction as light of different light emitting pattern, and said polarizing filter passes through a specific light having a polarization direction instructed by said instruction means.

8. A route guide system as claimed in claim 7, wherein said polarizing filter is disposed on the front glass of said vehicle.

9. A route guide system as claimed in claim 7, wherein said polarizing filter is formed in the form of sunglasses wearable by said driver of said vehicle.

10. A route guide method in which a route guide apparatus is set on a vehicle, and when the vehicle reaches nearby a turning point during traveling, said route guide apparatus displays the traveling direction of said vehicle to make guidance to the targeted destination, comprising the steps of:

providing a road guide plate indicating branching directions of the road and emitting light of different types of light-emitting pattern according to the branching directions in the vicinity of the turning point so that it is visible by a driver of the traveling vehicle; and providing optical means on the vehicle which selectively passes through light of one of the different light-emitting patterns so that it is visible by the driver of said vehicle traveling in the traveling direction of said vehicle;

whereby the route guide apparatus instructs the optical means of a type of light-emitting pattern to be selectively passed through.

* * * * *